(12) United States Patent
Eismin et al.

(10) Patent No.: US 12,496,765 B2
(45) Date of Patent: Dec. 16, 2025

(54) SYSTEM AND METHOD OF LAMINATION

(71) Applicant: 3M INNOVATIVE PROPERTIES COMPANY, St. Paul, MN (US)

(72) Inventors: Ryan J. Eismin, St. Paul, MN (US); David J. McDaniel, Lino Lakes, MN (US); Encai Hao, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 226 days.

(21) Appl. No.: 18/275,630

(22) PCT Filed: Feb. 4, 2022

(86) PCT No.: PCT/IB2022/051005
§ 371 (c)(1),
(2) Date: Aug. 3, 2023

(87) PCT Pub. No.: WO2022/175773
PCT Pub. Date: Aug. 25, 2022

(65) Prior Publication Data
US 2024/0109242 A1   Apr. 4, 2024

Related U.S. Application Data

(60) Provisional application No. 63/149,898, filed on Feb. 16, 2021.

(51) Int. Cl.
*B29C 63/00* (2006.01)
*B32B 7/12* (2006.01)
(Continued)

(52) U.S. Cl.
CPC ............ *B29C 63/0073* (2013.01); *B32B 7/12* (2013.01); *B32B 27/08* (2013.01); *B32B 37/003* (2013.01);
(Continued)

(58) Field of Classification Search
CPC ....... B29C 63/0073; B29C 63/02; B32B 7/12; B32B 27/08; B32B 37/003;
(Continued)

(56) References Cited

U.S. PATENT DOCUMENTS

2017/0129165 A1   5/2017 Lee et al.
2019/0329540 A1   10/2019 Kim et al.

FOREIGN PATENT DOCUMENTS

CN   108943689 A   12/2018
CN   109624297 A * 4/2019
(Continued)

OTHER PUBLICATIONS

CN109624297A Machine Translation of Description (Year: 2025).*
(Continued)

*Primary Examiner* — Cynthia L Schaller
(74) *Attorney, Agent, or Firm* — Jeffrey M. Olofson

(57) ABSTRACT

A system for laminating an adhesive to a component includes a liner including a first major surface facing the component and a second major surface opposite to the first major surface. An adhesive is disposed on the first major surface. The adhesive is configured to be laminated to the component. A support pad engages the second major surface of the liner for laminating the adhesive to the component. Each of the support pad and the liner undergoes deformation upon engagement of the support pad with the liner. The support pad includes a body made of an elastic pad material and includes an upper surface facing the component, a lower surface opposite to the upper surface, and a lateral surface disposed between the upper surface and the lower surface. The liner includes a conformable liner material having a liner elastic modulus from about 5 megapascals (MPa) to about 650 MPa.

19 Claims, 12 Drawing Sheets

(51) Int. Cl.
    *B32B 27/08*     (2006.01)
    *B32B 37/00*     (2006.01)
    *B32B 38/18*     (2006.01)

(52) U.S. Cl.
    CPC .. *B32B 38/1866* (2013.01); *B29K 2995/0077* (2013.01); *B29K 2995/0082* (2013.01); *B32B 2250/02* (2013.01); *B32B 2250/24* (2013.01); *B32B 2307/54* (2013.01); *B32B 2307/732* (2013.01); *B32B 2457/20* (2013.01)

(58) Field of Classification Search
    CPC ............ B32B 38/1866; B32B 2250/02; B32B 2250/24; B32B 2307/54; B32B 2307/732; B32B 2457/20; B32B 27/32; B32B 2307/412; B32B 2307/418; B32B 2307/712; B32B 2307/748; B32B 27/30; B32B 27/306; B29K 2995/0077; B29K 2995/0082
    See application file for complete search history.

(56) References Cited

FOREIGN PATENT DOCUMENTS

| | | | | |
|---|---|---|---|---|
| CN | 110126249 | A | * | 8/2019 |
| JP | 2019077172 | A | | 5/2019 |
| KR | 10-1588600 | A | | 2/2016 |
| KR | 10-2304016 | A | | 9/2021 |

OTHER PUBLICATIONS

CN110126249A Machine Translation of Description (Year: 2025).*
International Search Report received for PCT International Application No. PCT/IB2022/051005, mailed on May 16, 2022, 2 pages.

* cited by examiner

SYSTEM AND METHOD OF LAMINATION

CROSS REFERENCE TO RELATED APPLICATIONS

This application is a national stage filing under 35 U.S.C. 371 of PCT/IB2022/051005, filed Feb. 4, 2022, which claims the benefit of U.S. Provisional Application No. 63/149,898, filed Feb. 16, 2021, the disclosure of which is incorporated by reference in its/their entirety herein.

TECHNICAL FIELD

The present disclosure generally relates to a system and a method of lamination. More specifically, the present disclosure relates to a system and a method for laminating an adhesive to a component.

BACKGROUND

Electronic devices including portable and mobile computing devices, such as laptops, tablets, smartphones, and wearable devices, may include various curved components (e.g., curved displays). In some cases, one or more parts (e.g., display panels) may have to be bonded to such curved components. Consequently, there may be a need for laminating an adhesive to the curved components of the electronic devices. Conventional lamination systems and methods for laminating the adhesive to the curved components may form air bubbles between the adhesive and the curved components, thereby resulting in a poor lamination quality of the adhesive.

SUMMARY

In one aspect, a system for laminating an adhesive to a component is provided. The system includes a liner including a first major surface facing the component and a second major surface opposite to the first major surface. The system further includes an adhesive disposed on the first major surface of the liner. The adhesive is configured to be laminated to the component. The system further includes a support pad engaging the second major surface of the liner for laminating the adhesive to the component. Each of the support pad and the liner undergoes deformation upon engagement of the support pad with the liner. The support pad includes a body made of an elastic pad material. The body includes an upper surface facing the component and a lower surface opposite to the upper surface. The body further includes a lateral surface disposed between the upper surface and the lower surface. The liner includes a conformable liner material having a liner elastic modulus from about 5 megapascals (MPa) to about 650 MPa.

In another aspect, a method of laminating an adhesive to a component is provided. The method includes providing a liner including a first major surface and a second major surface, and an adhesive disposed on the first major surface of the liner. The method further includes pressing the second major surface of the liner on an upper surface of a support pad, such that the second major surface of the liner engages a lateral surface of the support pad and the support pad deforms. The method further includes moving the support pad against the component, such that the adhesive is laminated to the component. The support pad is made of an elastic pad material. The liner includes a conformable liner material having a liner elastic modulus from about 5 MPa to about 650 MPa.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

The disclosure may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

Figure 1:
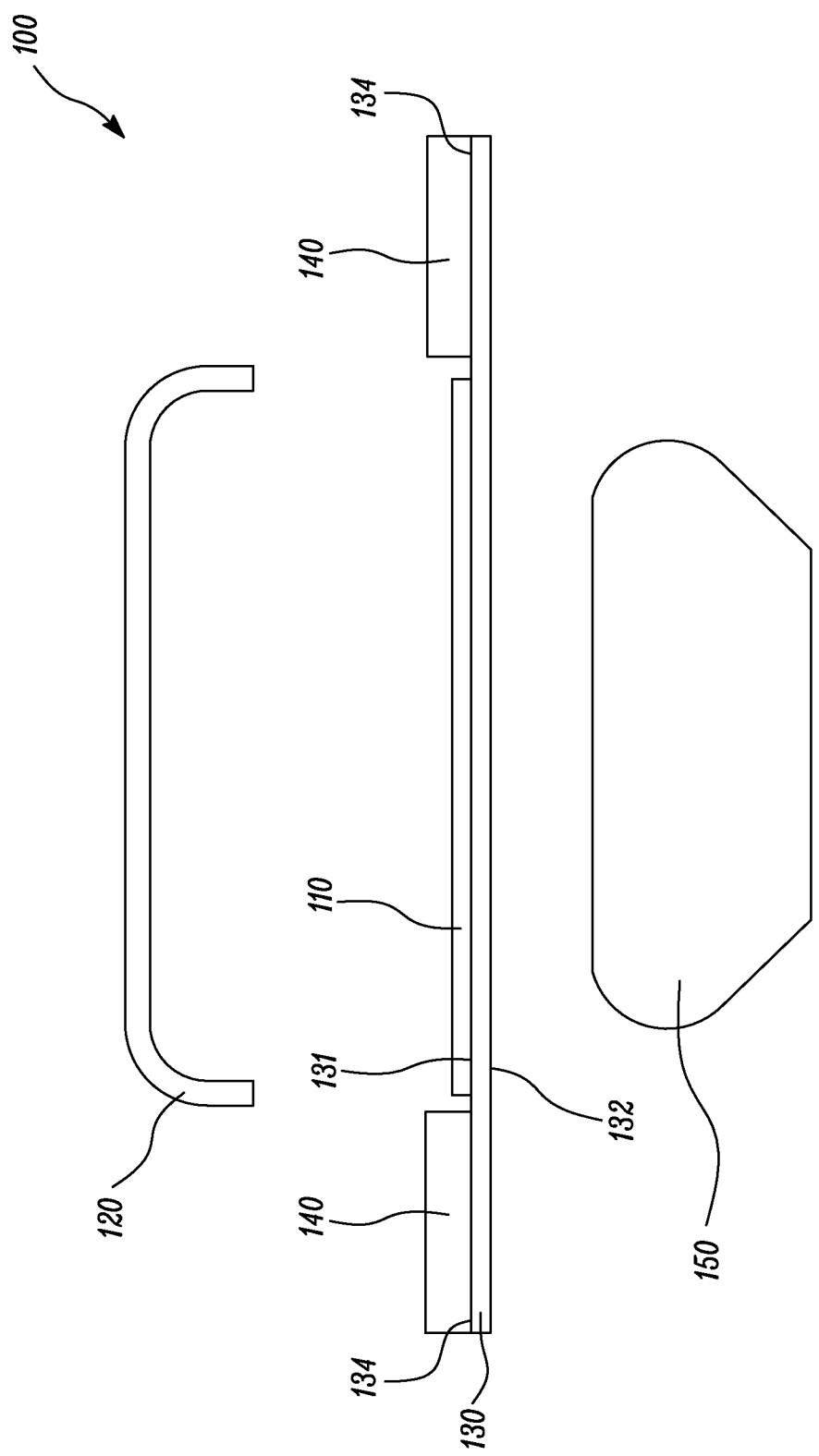
FIG. 1 is a schematic sectional side view of a system for laminating an adhesive to a component according to an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

According to aspects of this disclosure, a system for laminating an adhesive to a component is provided. The system includes a liner including a first major surface facing the component and a second major surface opposite to the first major surface. The system further includes an adhesive disposed on the first major surface of the liner. The adhesive is configured to be laminated to the component. The system further includes a support pad engaging the second major surface of the liner for laminating the adhesive to the component. Each of the support pad and the liner undergoes deformation upon engagement of the support pad with the liner. The support pad includes a body made of an elastic pad material. The body includes an upper surface facing the component and a lower surface opposite to the upper surface. The body further includes a lateral surface disposed between the upper surface and the lower surface. The liner includes a conformable liner material having a liner elastic modulus from about 5 MPa to about 650 MPa.

Conventional lamination systems and methods may form air bubbles between the component and the adhesive. In some cases, where the component includes one or more curved surfaces, the conventional lamination systems and methods may form the air bubbles between the adhesive and the curved surfaces of the component. Further, the conventional lamination systems and methods typically utilize a conventional support pad for laminating the adhesive to the component. However, the conventional support pad may deform undesirably during the during lamination of the adhesive to the component, and thus result in the formation of the air bubbles between the component and the adhesive. Presence of the air bubbles between the component and the adhesive may adversely affect optical properties of the component, such as light transmission, clarity, and haze. In some cases, the presence of the air bubbles may result in an unacceptable or poor quality of the bond between the component and the adhesive. In some cases, the presence of the air bubbles may further impact a viewing experience of a user.

The system according to the present disclosure may allow conforming the adhesive to a desired shape (i.e., a shape that may allow the adhesive to wet-out from a center of the component) for laminating the adhesive to the component. Specifically, the adhesive disposed on the liner may be conformed to the desired shape. The support pad may have an optimal shape in an undeformed state for laminating the adhesive to the component. When the liner is conformed to the support pad, the body of the support pad deforms to a deformed state. The support pad may need to retain the optimal shape in the deformed state when laminating the adhesive to the component for providing a good quality of lamination.

The system of the present disclosure may further allow the support pad to retain the optimal shape in the deformed state that may allow the adhesive to wet-out effectively. Therefore, the system may allow laminating the adhesive to the component with an improvement in a lamination quality. That is, the system may reduce or prevent the formation of the air bubbles between the adhesive and the component during lamination of the adhesive to the component. In some cases, where the component includes one or more curved surfaces, the system may reduce or prevent the formation of the air bubbles between the adhesive and the curved surfaces of the component.

Now referring to the figures, FIG. 1 illustrates a system 100 for laminating an adhesive 110 to a component 120. The component 120 may include any component of an electronic device. For example, the component 120 may include a display glass of a wearable watch. In another example, the component 120 may include a display glass of a mobile device. In yet another example, the component 120 may include a body of the electronic device. As shown in FIG. 1, in some embodiments, the component 120 includes one or more curved surfaces. For example, the component 120 may include a curved display glass of a mobile device, such as a smartphone, a wearable watch, and the like. In some embodiments, the component 120 may curve out of plane in two or more axes. In some embodiments, the component 120 may include a substantially planar surface with convex surfaces protruding from edges of the substantially planar surface. However, the component 120 is not limited to the examples discussed above.

In some embodiments, the system 100 may be disposed in a class 10,000 cleanroom, or better. In some other embodiments, the system 100 may be disposed in a vacuum chamber. In some embodiments, the system 100 may include a controller (not shown). One or more elements of the system 100 may be controlled by the controller. Therefore, in some embodiments, the system 100 may be an automated system.

In some embodiments, the component 120 may be removably secured to a first jig (not shown). The first jig may provide vertical and horizontal movement to the component 120. In some embodiments, the first jig may be motorized and controlled by the controller of the system 100.

Some elements of the system 100 may define various lamination parameters. The lamination parameters may be modified to improve a lamination quality of the adhesive 110 by the system 100.

The system 100 further includes a liner 130. The liner 130 includes a first major surface 131 facing the component 120. The liner 130 further includes a second major surface 132 opposite to the first major surface 131. In some embodiments, the first major surface 131 and the second major surface 132 of the liner 130 may be substantially planar.

The adhesive 110 is disposed on the first major surface 131 of the liner 130. The adhesive 110 is configured to be laminated to the component 120. Accordingly, in some embodiments, the adhesive 110 may be uniformly disposed on the first major surface 131 of the liner 130. In some other embodiments, the adhesive 110 may not be uniformly disposed on the first major surface 131 of the liner 130, however, the adhesive 110 may be configured to uniformly laminate the component 120.

Further, the adhesive 110 may have suitable optical and physical properties, such as transparency, adhesion, refractive index, environmental resistance, etc., as per desired application attributes. For example, the adhesive 110 may include a photocurable resin or a thermosetting resin having high transmissivity and adhesiveness. In another example, the adhesive 110 may include a clear acrylic adhesive having high transmissivity and adhesiveness. In some embodiments, the adhesive 110 may include an optically clear adhesive (OCA). However, the adhesive 110 is not limited to the examples discussed above.

In the illustrated embodiment of FIG. 1, the liner 130 further includes a perimeter 134. Specifically, the perimeter 134 may be defined on a periphery of the first major surface 131 and/or the second major surface 132 of the liner 130. Further, in some embodiments, a clamp 140 may be applied on the perimeter 134 of the liner 130. In other words, the perimeter 134 of the liner 130 may be clamped by the clamp 140. In the illustrated embodiment of FIG. 1, the perimeter 134 is defined on the periphery of the first major surface 131 of the liner 130. Furthermore, the clamp 140 is applied on the perimeter 134. In some embodiments, the clamp 140 may be motorized and controlled by the controller (not shown) of the system 100.

The liner 130 may be stretchable and conformable. Specifically, the liner 130 may conform to a desired shape (i.e., a shape that may allow the adhesive 110 disposed on the liner 130 to wet-out from a center of the component 120) for lamination. Consequently, the adhesive 110 disposed on the first major surface 131 of the liner 130 may also conform to the desired shape. Specifically, the liner 130 includes a conformable liner material having a liner elastic modulus from about 5 megapascals (MPa) to about 650 MPa. In some embodiments, the liner 130 may not undergo plastic deformation (e.g., when the liner material includes polyurethane) when the liner 130 conforms to or engages with another surface or component, for example, a support pad 150.

In some other embodiments, the liner 130 may undergo plastic deformation after yield (e.g., when the liner material includes polyethylene, polypropylene, and the like) when the liner 130 conforms to or engages with the support pad 150. In such embodiments, a yield stress of the liner material is from about 10 MPa to about 100 MPa. Furthermore, in some embodiments, a liner tangent modulus of the liner material is from about 1 MPa to about 1.5 MPa after yield.

In some embodiments, the liner material includes at least one of polyurethane, polyethylene, polypropylene, ethylene-vinyl acetate, and polyvinyl butyl. In some embodiments, the liner material may include Kraton™. In some embodiments, the liner material may be one of the lamination parameters. Since the liner elastic modulus depends on the liner material, the liner elastic modulus may also be one of the lamination parameters.

The system 100 further includes the support pad 150. The support pad 150 engages the second major surface 132 of the liner 130 for laminating the adhesive 110 to the component 120. Each of the support pad 150 and the liner 130 undergoes deformation upon engagement of the support pad 150 with the liner 130. In some embodiments, a shape of the support pad 150 may correspond to a shape of the component 120.

In some embodiments, the support pad 150 may define various pad parameters. In some embodiments, the support pad 150 may further define some of the lamination parameters. The pad parameters may be modified to improve the lamination quality of the adhesive 110 by the system 100. Specifically, the pad parameters may be modified by modifying or varying the lamination parameters. Subsequently, modifying the lamination parameters may improve the lamination quality of the adhesive 110 by the system 100. The support pad 150 will be discussed in detail with additional reference to FIG. 2.

Figure 2:
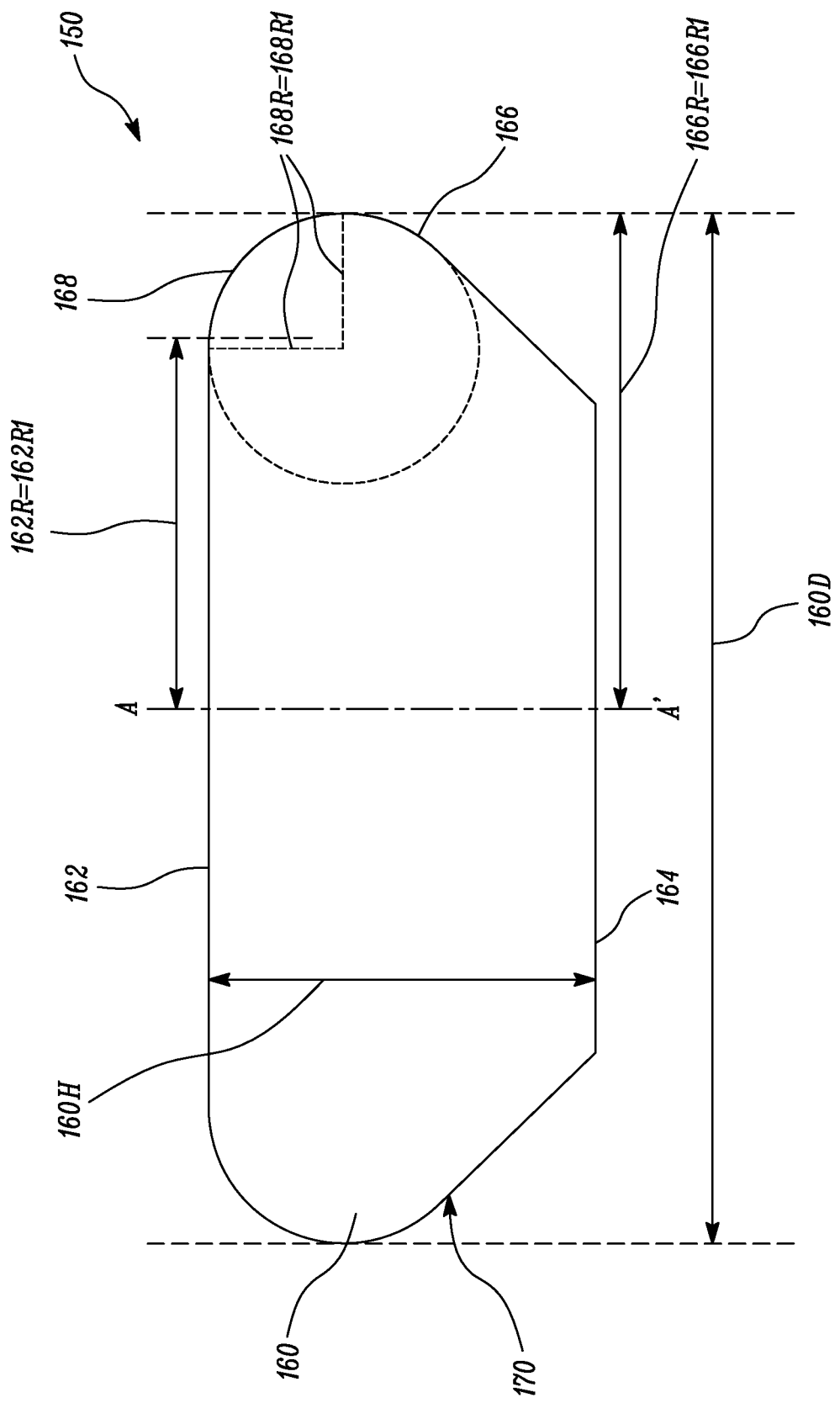
FIG. 2 is a schematic sectional side view of a support pad of the system according to an embodiment of the present disclosure.

FIG. 2 illustrates the support pad 150 and the some of the pad parameters defined by the support pad 150, according to an embodiment of the present disclosure. The support pad 150 includes a body 160 made of an elastic pad material. In some embodiments, the body 160 may define an axis AA'. In the illustrated embodiment of FIG. 2, the support pad 150 is substantially axisymmetric about the axis AA'. However, in some other embodiments, the support pad 150 may be non-axisymmetric about the axis AA'. In other words, the shape of the support pad 150 may be substantially axisymmetric about the axis AA', or non-axisymmetric about the axis AA', as per desired application attributes. As discussed above, the shape of the support pad 150 may correspond to the shape of the component 120. Therefore, the shape of the support pad 150 may vary as per desired application attributes. Thus, the shape of the support pad 150 is not limited to the examples described in the present disclosure.

Referring to FIGS. 1 and 2, the body 160 includes an upper surface 162, a lower surface 164, and a lateral surface 166. The upper surface 162, the lower surface 164, and the lateral surface 166 may define some of the pad parameters. As discussed above, the pad parameters may be modified by modifying the lamination parameters to improve the lamination quality of the adhesive 110 by the system 100.

Figure 3A:
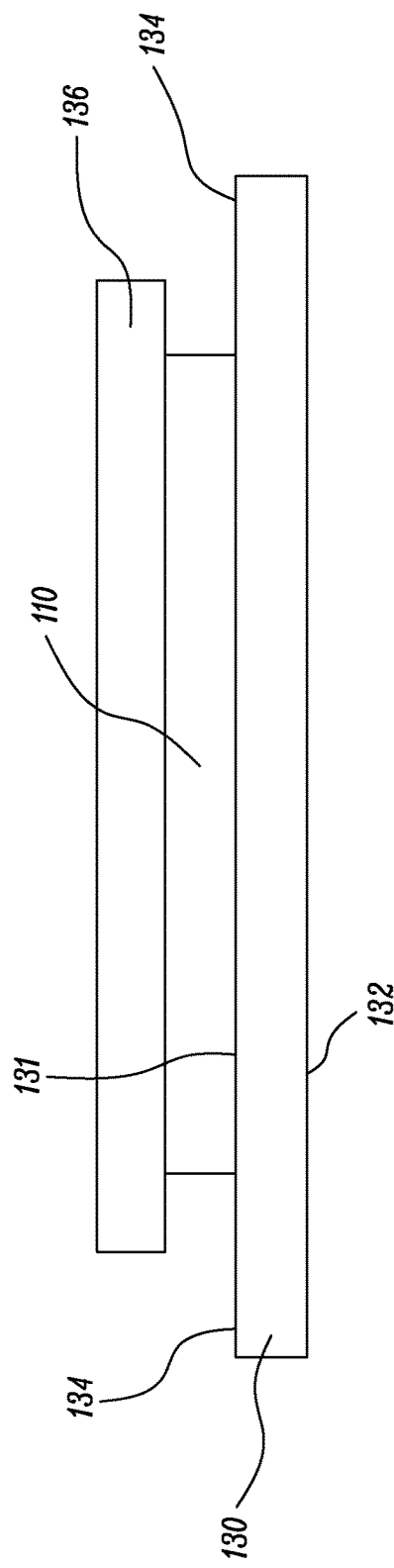
FIG. 3A is a schematic sectional side view of a liner including the adhesive, and a top liner according to an embodiment of the present disclosure.
Figure 3B:
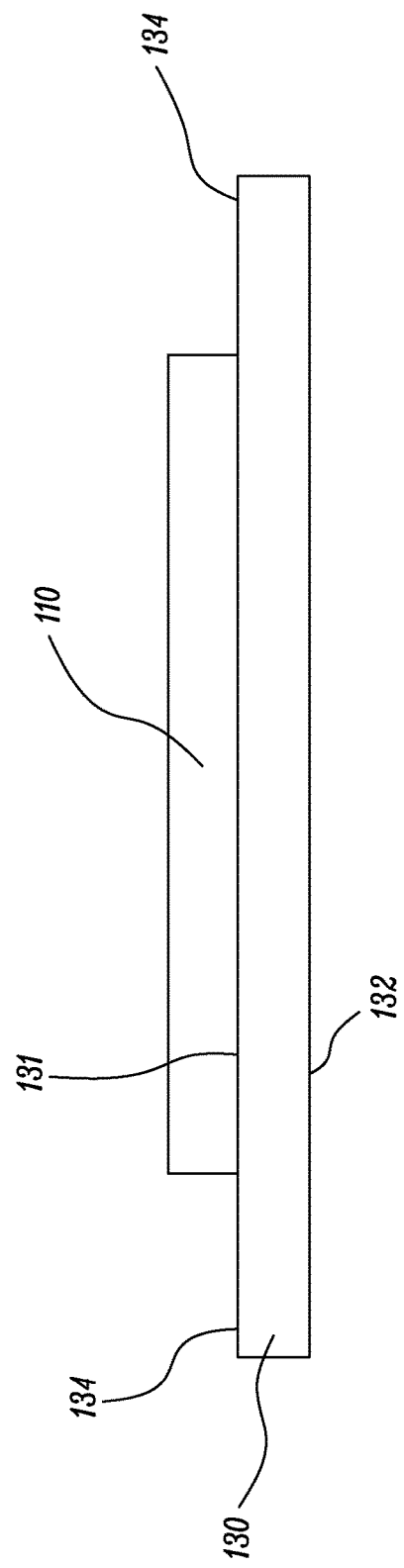
FIG. 3B is a schematic sectional side view of the liner including the adhesive with the top liner removed according to an embodiment of the present disclosure.
Figure 3C:
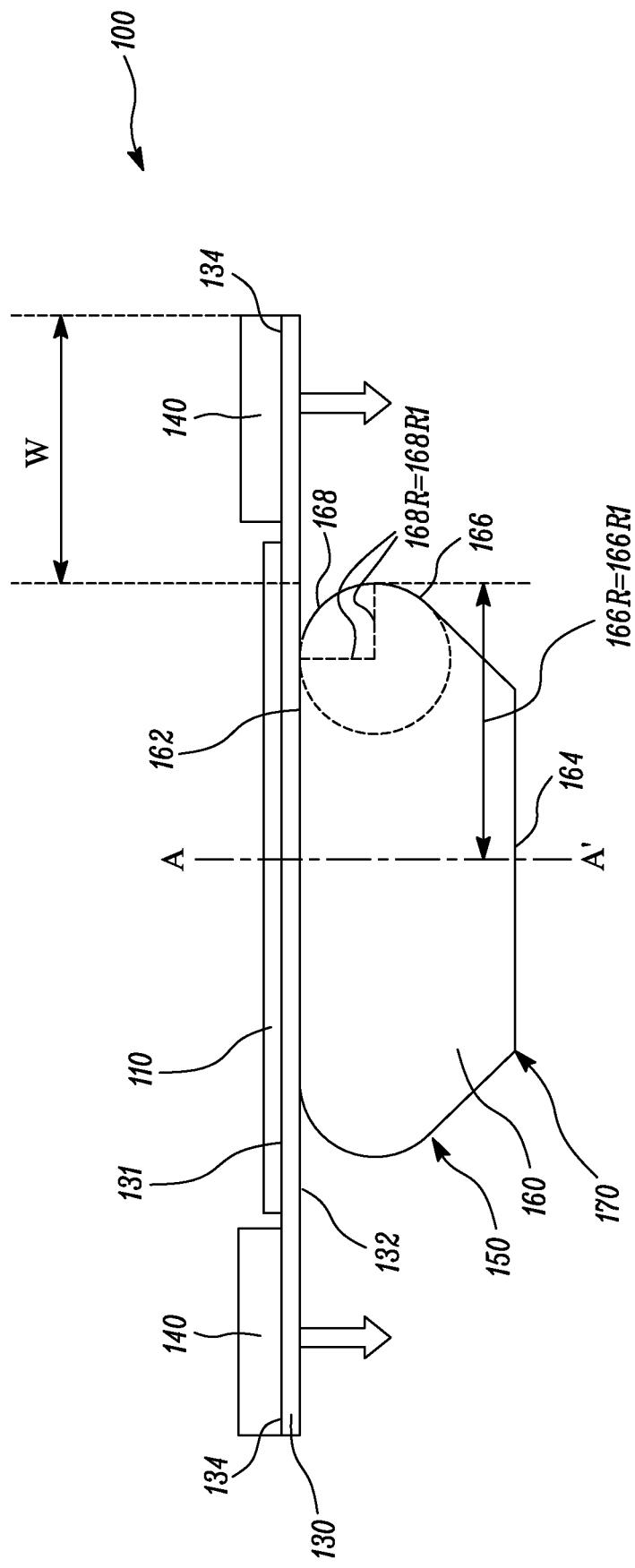
FIG. 3C is a schematic sectional side view of the system with a clamp applied to the liner according to an embodiment of the present disclosure.
Figure 3D:
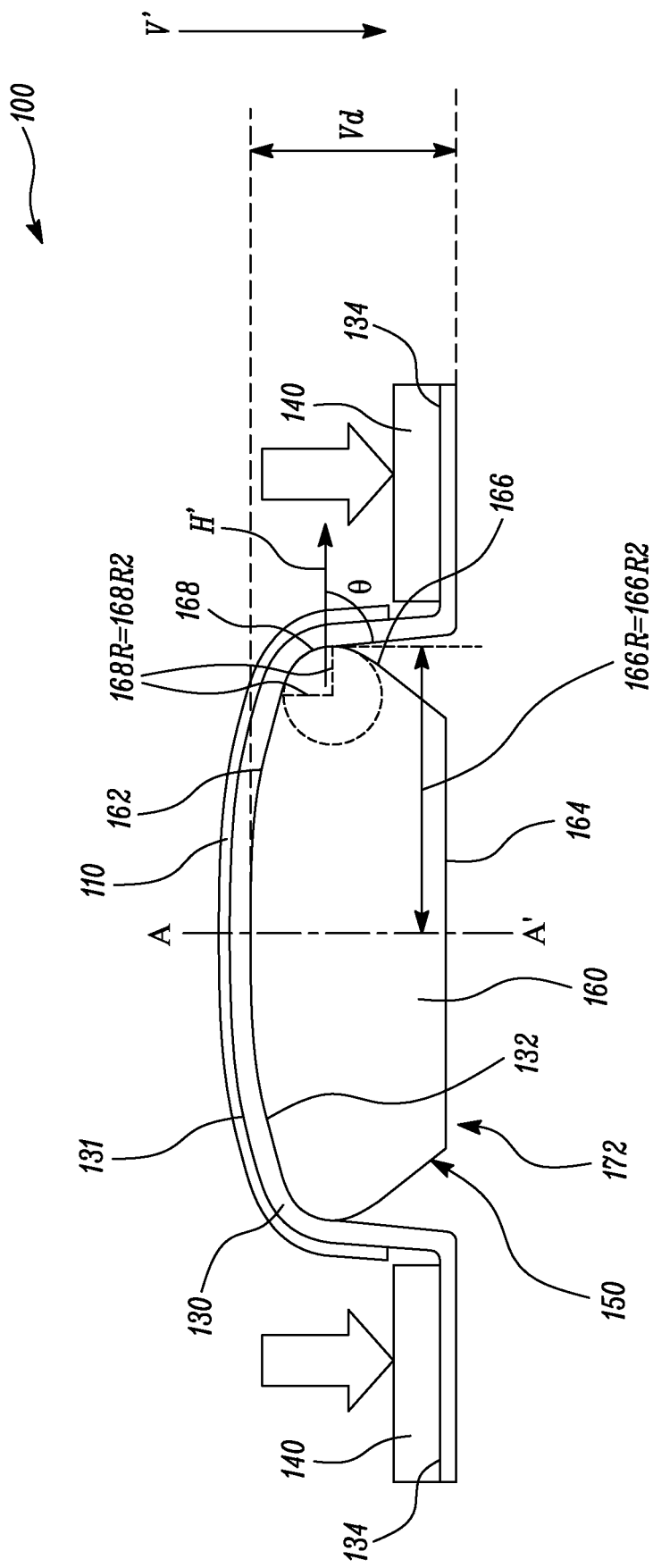
FIG. 3D is a schematic sectional side view of the system with the liner stretched on the support pad according to an embodiment of the present disclosure.

In some embodiments, the body 160 has an undeformed state 170 and a deformed state 172 (shown in FIG. 3D). The body 160 may elastically deform from the undeformed state 170 to the deformed state 172 upon engagement of the support pad 150 with the liner 130.

The upper surface 162 faces the component 120. In some embodiments, the upper surface 162 of the body 160 is substantially planar. Specifically, the upper surface 162 of the body 160 may be substantially planar in the undeformed state 170 of the body 160. Further, in some embodiments, the upper surface 162 of the body 160 may have a curved shape in the deformed state 172 (shown in FIG. 3D). The curved shape of the upper surface 162 in the deformed state 172 may allow the adhesive 110 to wet-out radially outwards from a center of the component 120 during lamination, thereby improving the lamination quality of the adhesive 110 by the system 100.

The lower surface 164 is opposite to the upper surface 162. In some embodiments, the lower surface 164 of the body 160 may be substantially planar. Specifically, the lower surface 164 of the body 160 may be substantially planar in the undeformed state 170 of the body 160. In some embodiments, the lower surface 164 of the body 160 may be removably secured to a second jig (not shown). The second jig may provide vertical and horizontal movement to the support pad 150. In some embodiments, the second jig may be motorized and controlled by the controller (not shown) of the system 100.

The lateral surface 166 is disposed between the upper surface 162 and the lower surface 164. In other words, the lateral surface 166 may extend between the upper surface 162 and the lower surface 164 of the body 160. In the illustrated embodiment of FIG. 2, the lateral surface 166 includes a curved portion 168 extending from the upper surface 162. In some embodiments, the curved portion 168 defines an average corner radius 168R. The average corner radius 168R may be an inverse of an average curvature of the curved portion 168. Further, the average corner radius 168R is equal to an original average corner radius 168R1 in the undeformed state 170 of the body 160. Furthermore, the average corner radius 168R is equal to a deformed average corner radius 168R2 in the deformed state 172 of the body 160 (shown in FIG. 3D).

As shown in FIG. 2, in some embodiments, the upper surface 162 defines a contact radius 162R. The contact radius 162R may extend from the axis AA' to the curved portion 168. In other words, the contact radius 162R may extend between the axis AA' and the curved portion 168. In some embodiments, the contact radius 162R is equal to an original contact radius 162R1 in the undeformed state 170 of the body 160.

In the illustrated embodiment of FIG. 2, the lateral surface 166 defines a maximum radius 166R. The maximum radius 166R may be defined as a maximum distance normal to the axis AA' from the axis AA' to the lateral surface 166.

Further, the maximum radius 166R is equal to an original maximum radius 166R1 in the undeformed state 170 of the body 160.

As shown in FIG. 2, in some embodiments, the body 160 defines a height 160H from the upper surface 162 to the lower surface 164. The height 160H may be defined as a maximum distance along the axis AA' from the upper surface 162 to the lower surface 164 in the undeformed state 170 of the body 160. In some embodiments, the height 160H is from about 5 millimeters (mm) to about 20 mm. In some embodiments, the height 160H of the body 160 may be less than about 5 mm, less than about 4 mm, less than about 3 mm, less than about 2 mm, or less than about 1 mm. In some embodiments, the height 160H of the body 160 may be greater than about 20 mm, greater than about 30 mm, greater than about 40 mm, greater than about 50 mm, greater than about 60 mm, greater than about 70 mm, greater than about 80 mm, greater than about 90 mm, or greater than about 100 mm.

In the illustrated embodiment of FIG. 2, the body 160 further defines a maximum diameter 160D. The maximum diameter 160D may be defined as a maximum distance normal to the axis AA' between the lateral surface 166 of the body 160. The body 160 may define the maximum diameter 160D in the undeformed state 170 of the body 160. In some embodiments, the maximum diameter 160D may be from about 10 mm to about 300 mm. In some embodiments, the maximum diameter 160D is from about 40 mm to about 70 mm.

The contact radius 162R, the maximum radius 166R, and the average corner radius 168R may be some of the pad parameters.

As discussed above, the body 160 is made of the elastic pad material. Referring to FIGS. 1 and 2, the support pad 150 deforms when the second major surface 132 of the liner 130 engages the lateral surface 166 of the support pad 150. Therefore, in some embodiments, the elastic pad material has a pad elastic modulus. In some embodiments, the pad elastic modulus may be from about 1 MPa to about 35 MPa. In some embodiments, the pad elastic modulus may be greater than about 5 MPa, greater than about 10 MPa, greater than about 15 MPa, greater than about 20 MPa, greater than about 25 MPa, greater than about 30 MPa, greater than about 35 MPa, or greater than about 40 MPa. In some embodiments, the pad elastic modulus may be about 33 MPa. The elastic pad material may be selected according to the pad elastic modulus.

The pad elastic modulus, the height 160H, and the maximum diameter 160D may be some of the lamination parameters.

FIGS. 3A-3G illustrate various steps for laminating the adhesive 110 to the component 120 according to an embodiment of the present disclosure.

Referring to FIGS. 3A and 3B, as discussed above, the liner 130 includes the first major surface 131 and the second major surface 132 opposite to the first major surface 131. Furthermore, the adhesive 110 is disposed on the first major surface 131 of the liner 130. As shown in FIG. 3A, in some embodiments, atop liner 136 is disposed on the adhesive 110 opposite to the liner 130. In some embodiments, the top liner 136 may include polyethylene terephthalate (PET). Further, the top liner 136 may be a releasable liner. In some embodiments, the top liner 136 may be releasably secured to the adhesive 110 to protect the adhesive 110 from contaminants (e.g., dust, debris, etc.) prior to lamination of the adhesive 110 to the component 120 (shown in FIG. 1). As shown in FIG. 3B, the top liner 136 is removed from the adhesive 110 prior to applying the clamp 140 (shown in FIG. 3C) to the perimeter 134 of the liner 130.

Referring to FIG. 3C, in some embodiments, the liner 130 moves toward the support pad 150 until the second major surface 132 of the liner 130 is disposed on the upper surface 162 of the body 160. In some embodiments, the clamp 140 is applied to the perimeter 134 of the liner 130, and the liner 130 may be moved toward the support pad 150 by the clamp 140. As shown in FIG. 3C, the body 160 is in the undeformed state 170 before the liner 130 is pressed on the upper surface 162 of the body 160. The average corner radius 168R of the curved portion 168 is equal to the original average corner radius 168R1 in the undeformed state 170 of the body 160. Furthermore, the maximum radius 166R is equal to the original maximum radius 166R1. In some embodiments, the liner 130 further defines a liner extension W. The liner extension W may be defined as a distance normal to the axis AA' from the lateral surface 166 of the body 160 to an end of the liner 130 proximal to the perimeter 134. In some embodiments, the liner extension W may be one of the lamination parameters. In some embodiments, the liner extension W may range from about 1 mm to about 10 mm. In some embodiments, the liner extension W may be greater than about 5 mm, greater than about 6 mm, greater than about 7 mm, greater than about 8 mm, greater than about 9 mm, or greater than about 10 mm.

Referring to FIG. 3D, the liner 130 may be pressed on the upper surface 162 of the body 160. Specifically, the second major surface 132 of the liner 130 may be pressed on the upper surface 162 of the body 160. In the illustrated embodiment of FIG. 3D, the clamp 140 may press the liner 130 on the upper surface 162 of the body 160. In some embodiments, the clamp 140 may stretch the liner 130 in a vertical direction V' by a vertical distance Vd. In some embodiments, the vertical distance Vd may be from about 2 mm to about 20 mm. In some embodiments, the vertical distance Vd is greater than about 2 mm, greater than about 4 mm, greater than about 6 mm, greater than about 8 mm, or greater than about 10 mm.

As shown in FIG. 3D, the body 160 deforms to the deformed state 172 when the liner 130 is pressed on the upper surface 162 of the body 160. The pad parameters defined in the undeformed state 170 of the body 160 (such as, the contact radius 162R, the maximum radius 166R, and the average corner radius 168R, shown in FIGS. 2 and 3C) may change in the deformed state 172 of the body 160. For example, the average corner radius 168R is equal to the deformed average corner radius 168R2 in the deformed state 172 of the body 160. Furthermore, the maximum radius 166R may be equal to a deformed maximum radius in the deformed state 172 of the body 160. The change in the pad parameters may be optimized by modifying the lamination parameters to retain an optimal shape of the support pad 150 in the deformed state 172 of the body 160, such that the lamination quality of the adhesive 110 by the system 100 may improve.

Furthermore, in some embodiments, the second major surface 132 of the liner 130 engages the lateral surface 166 during lamination of the adhesive 110 to the component 120 (shown in FIG. 1), such that an exit angle θ is defined between the liner 130 and a longitudinal direction H'. Specifically, the exit angle θ may be defined between a tangent to a point of the lateral surface 166 and the longitudinal direction H'. The point of the lateral surface 166 may be located on a line of the lateral surface 166 where the liner 130 starts disengaging from the lateral surface 166. In other words, the point of the lateral surface 166 may be located on the line of the lateral surface 166 where the liner 130 last makes contact with the lateral surface 166. The liner 130 may start exiting or disengaging from the body 160 at the line of the lateral surface 166. The longitudinal direction H' may be a horizontal direction normal to the vertical direction V'. In some embodiments, the longitudinal direction H' may be normal to the axis AA'. The exit angle θ may be one of the pad parameters. In some embodiments, the exit angle θ may be from about 70 degrees to about 90 degrees. In some embodiments, the exit angle θ is about 90 degrees. In some embodiments, the exit angle θ may be about 90 degrees when the liner elastic modulus of the liner 130 is about 5 MPa.

Referring to FIGS. 3C and 3D, in some embodiments, the pad elastic modulus is from about 1 MPa to about 35 MPa, such that a difference between the deformed average corner radius 168R2 and the original average corner radius 168R1 is less than or equal to 25% of the original average corner radius 168R1. In some embodiments, the pad elastic modulus is from about 1 MPa to about 35 MPa, such that the difference between the deformed average corner radius 168R2 and the original average corner radius 168R1 is less than or equal to 20%, or less than or equal to 15% of the original average corner radius 168R1.

Further, in some embodiments, the liner elastic modulus is about 5 MPa, such that the difference between the deformed average corner radius 168R2 and the original average corner radius 168R1 is less than or equal to 10% of the original average corner radius 168R1. In some embodiments, the liner elastic modulus is about 5 MPa, such that the difference between the deformed average corner radius 168R2 and the original average corner radius 168R1 is less than or equal to 8%, less than or equal to 6%, or less than or equal to 4% of the original average corner radius 168R1.

Furthermore, in some embodiments, the height 160H (shown in FIG. 2) is about 15 mm, such that a change in the contact radius 162R (shown in FIG. 2) between the deformed state 172 and the undeformed state 170 of the body 160 is less than 5% of the original contact radius 162R1. In some embodiments, the liner elastic modulus is about 5 MPa, such that the change in the contact radius 162R between the deformed state 172 and the undeformed state 170 of the body 160 is less than 2% of the original contact radius 162R1. In some embodiments, a change in the maximum radius 166R between the deformed state 172 and the undeformed state 170 of the body 160 is less than 5% of the original maximum radius 166R1 when the pad elastic modulus of the body 160 is about 33 MPa.

Figure 3E:
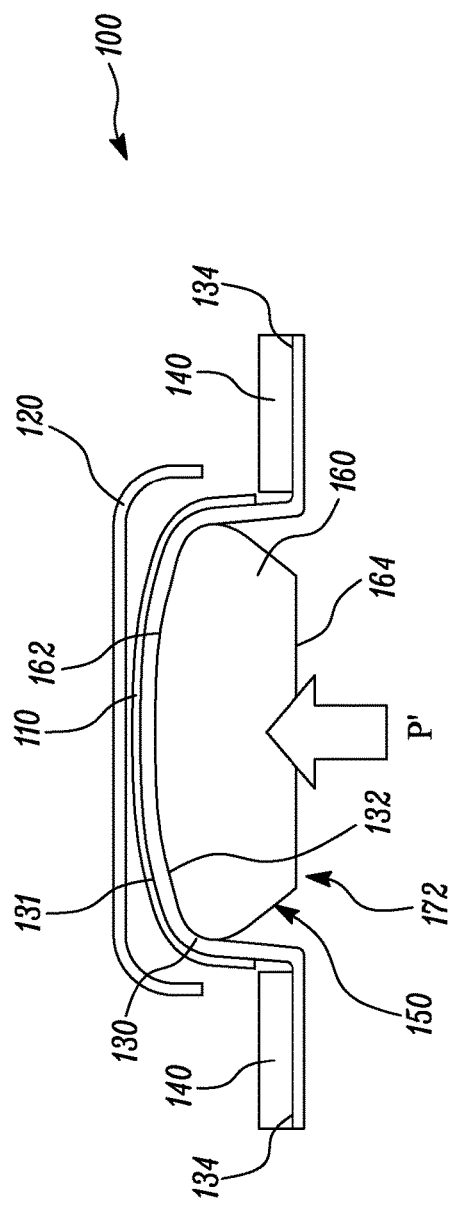
FIG. 3E is a schematic sectional side view of the system shown in FIG. 3D with the support pad moved toward the component according to an embodiment of the present disclosure.
Figure 3F:
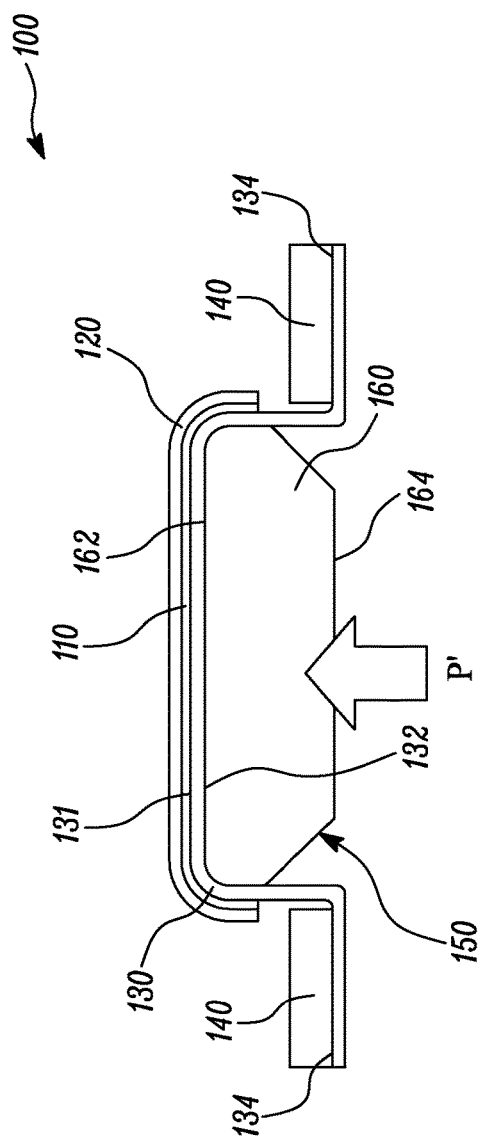
FIG. 3F is a schematic sectional side view of the system with the liner and the support pad pressed against the component according to an embodiment of the present disclosure.

Referring to FIGS. 3E and 3F, the support pad 150 with the body 160 in the deformed state 172 may be moved against the component 120. In some embodiments, the first and the second jigs (not shown) may be used to move the component 120 and the support pad 150 against each other.

The component 120 and the support pad 150 may be moved against each other such that the adhesive 110 is laminated to the component 120. In some embodiments, a pressure P' is applied to the support pad 150 to move the support pad 150 against the component 120. In some embodiments, the pressure P' may be applied to the support pad 150 by the second jig (not shown). In some embodiments, the pressure P' may be from about 250 kilopascals (kPa) to about 1600 kPa. In some other embodiments, the pressure P' is from about 500 kPa to about 800 kPa. Further, in some embodiments, the pressure P' may vary from about 100 kPa to about 2000 kPa while laminating the adhesive 110 to the component 120. For example, the pressure P' may be relatively low (for e.g., about 100 kPa) while moving the support pad 150 against the component 120 before the adhesive 110 contacts the component 120. Subsequently, the pressure P' may increase (e.g., about 500 kPa or above) after the adhesive 110 contacts the component 120.

Figure 3G:
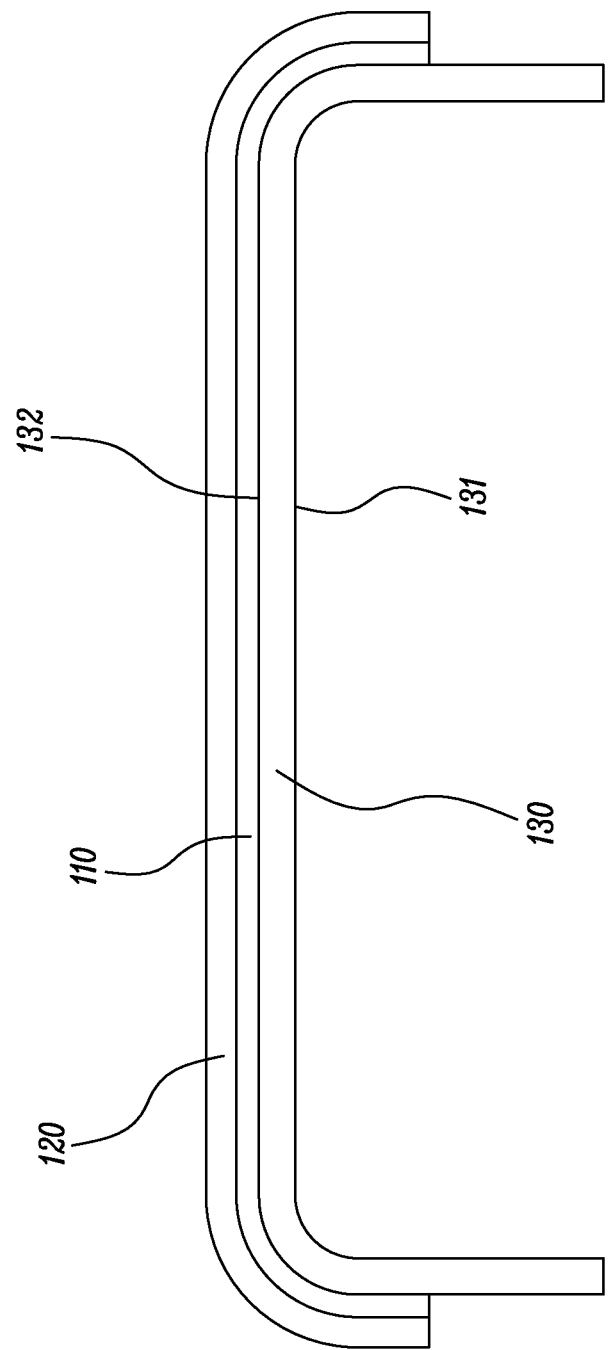
FIG. 3G is a schematic sectional side view of the adhesive laminated to the component according to an embodiment of the present disclosure.

FIG. 3G illustrates the adhesive 110 laminated to the component 120. As shown in FIG. 3G, the component 120 and the adhesive 110 may not include air bubbles therebetween. Therefore, the system 100 may provide an improved lamination quality of the adhesive 110 as compared to conventional lamination systems. In some embodiments, the liner 130 may be removed from the adhesive 110 in order to laminate other components to the adhesive 110 and the component 120. That is, after removing the liner 130 from the adhesive 110, the other components (such as, a display panel) may be laminated to the adhesive 110 and the component 120.

Figure 4:
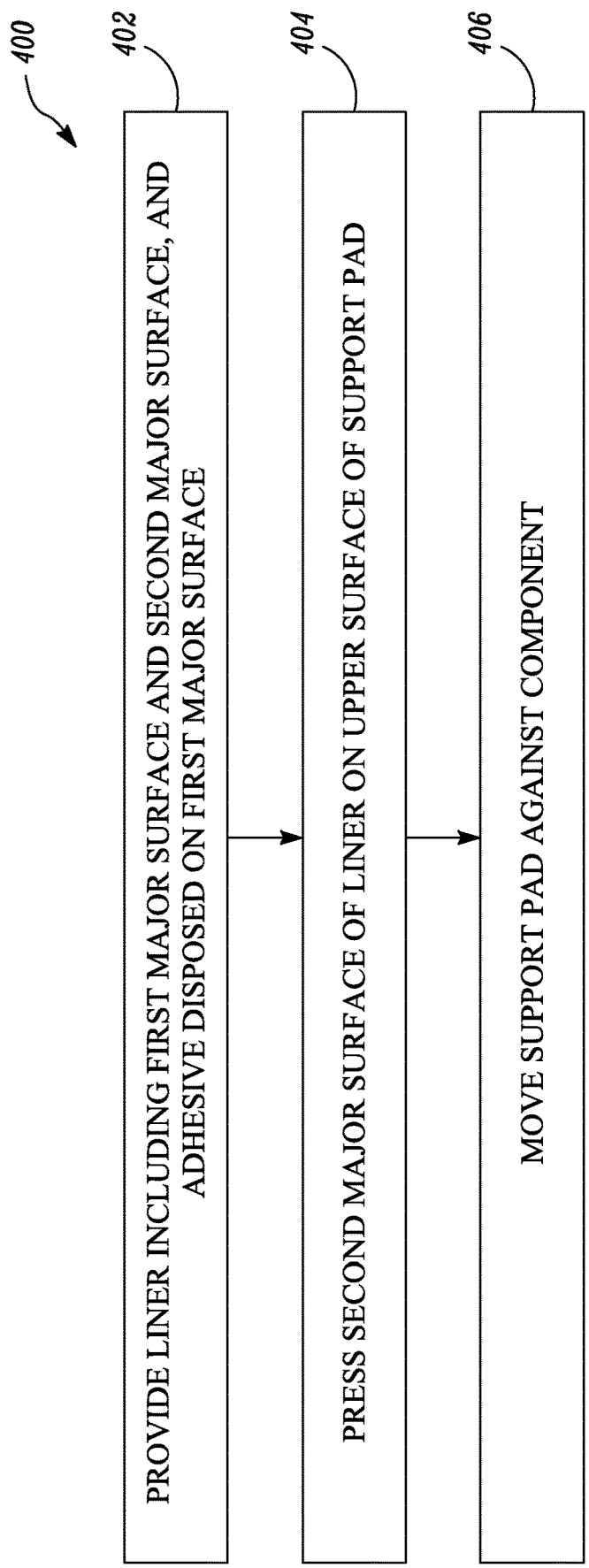
FIG. 4 is a flowchart illustrating various steps of a method of laminating the adhesive to the component according to an embodiment of the present disclosure.

FIG. 4 illustrates a flowchart of a method 400 of laminating the adhesive 110 to the component 120. The method 400 may be used to laminate the adhesive 110 to the component 120 by the system 100. In some embodiments, the method 400 may be performed in a cleanroom, i.e., in a class 10,000 cleanroom, or better. In some embodiments, the method 400 may be performed in vacuum, i.e., in a vacuum chamber. The method 400 will be described with reference to FIGS. 1, 2, 3A-3G and 4. The method 400 includes the following steps:

At step 402, the method 400 includes providing the liner 130 including the first major surface 131 and the second major surface 132, and the adhesive 110 disposed on the first major surface 131 of the liner 130. In some embodiments, the adhesive 110 may be uniformly disposed on the first major surface 131 of the liner 130. In some embodiments, the method 400 further includes removing the top liner 136 from the adhesive 110 opposite to the liner 130. In some embodiments, the method 400 further includes applying the clamp 140 to the perimeter 134 of the liner 130.

At step 404, the method 400 includes pressing the second major surface 132 of the liner 130 on the upper surface 162 of the support pad 150, such that the second major surface 132 of the liner 130 engages the lateral surface 166 of the support pad 150 and the support pad 150 deforms. In some embodiments, pressing the second major surface 132 of the liner 130 on the upper surface 162 of the support pad 150 further includes stretching the liner 130 in the vertical direction V' by the vertical distance Vd. In some embodiments, the vertical distance Vd is from about 4 mm to about 10 mm. In some embodiments, the liner 130 may be stretched in the vertical direction V' by the clamp 140.

At step 406, the method 400 includes moving the support pad 150 against the component 120, such that the adhesive 110 is laminated to the component 120. In some embodiments, moving the support pad 150 against the component 120 further includes moving the component 120 against the support pad 150 prior to moving the support pad 150 against the component 120. In some embodiments, moving the support pad 150 against the component 120 further includes applying the pressure P' on the support pad 150. In some embodiments, the pressure P' may be from about 250 kPa to about 1600 kPa. In some other embodiments, the pressure P' is from about 500 kPa to about 800 kPa. In some embodiments, the adhesive 110 may wet-out radially outwards from the center of the component 120 upon applying the pressure P'. In some embodiments, the method 400 further includes moving the support pad 150 away from the component 120.

Experimental Results

The disclosure is further described with reference to following experimental results. The following experimental results are offered for illustrative purposes only and are not intended to limit the scope of the disclosure.

Various experiments were performed by varying one lamination parameter from a standard value of the one lamination parameter. The liner 130 was then pressed on the support pad 150 such that the support pad 150 deformed from the undeformed state 170 (shown in FIG. 2) to the deformed state 172 (shown in FIG. 3D).

A change in the pad parameter with respect to the change in the one lamination parameter was observed. Some of the pad parameters and the lamination parameters have been discussed above with reference to FIGS. 2-3D.

Table 1A provided below illustrates standard values of various lamination parameters. It may be noted that a thickness of the liner 130 (shown in FIG. 1) was kept constant (80 micrometers) throughout the experiments.

TABLE 1A

| Lamination Parameter | Standard Value |
| --- | --- |
| Liner Elastic Modulus | 188 MPa |
| Pad Elastic Modulus | 3.3 MPa |
| Height (160H) | 5 mm |
| Pressure (P') | 500 kPa |
| Liner Extension (W) | 1 mm |

TABLE 1A-continued

| Lamination Parameter | Standard Value |
| --- | --- |
| Maximum Radius (166R) | 21.37 mm |
| Vertical Distance (Vd) | 7 mm |

Table 1B provided below illustrates values of the pad parameters in the undeformed state 170 of the body 160 and the deformed state 172 of the body 160 based on the standard values of the lamination parameters shown in Table 1A.

TABLE 1B

| Pad Parameter | Undeformed State | Deformed State |
| --- | --- | --- |
| Average Corner Radius (168R) | 1 mm | 1.807 mm |
| Exit Angle (θ) | 90 degrees | 81.96 degrees |
| Contact Radius (162R) | 20.953 mm | 19.6995 mm |
| Maximum Radius (166R) | 21.8295 mm | 21.37 mm |

Tables 2-5 provided below illustrate values of the pad parameters in the deformed state 172 of the body 160 based on the variation of the lamination parameters.

Table 2 provided below illustrates values of the pad parameters in the deformed state 172 of the body 160 based on the variation of the liner elastic modulus of the liner 130 (Case 1).

TABLE 2

| Liner Elastic Modulus | | | | |
| --- | --- | --- | --- | --- |
| Case 1 (MPa) | Average Corner Radius 168R (mm) | Exit Angle θ (degrees) | Contact Radius 162R (mm) | Maximum Radius 166R (mm) |
| 5 | 1.087 | 90.599 | 20.9505 | 22.016 |
| 188 | 1.807 | 81.960 | 19.6995 | 21.8295 |
| 650 | 2.288 | 80.249 | 19.007 | 21.7705 |

Table 3 provided below illustrates values of the pad parameters in the deformed state 172 of the body 160 based on the variation of the height 160H of the body 160 (Case 2).

TABLE 3

| Height (160H) | | | | |
| --- | --- | --- | --- | --- |
| Case 2 (mm) | Average Corner Radius 168R (mm) | Exit Angle θ (degrees) | Contact Radius 162R (mm) | Maximum Radius 166R (mm) |
| 5 | 1.807 | 81.960 | 19.6995 | 22.016 |
| 10 | 1.709 | 79.122 | 20.3645 | 21.8295 |
| 15 | 1.532 | 78.858 | 20.8285 | 21.7705 |

Table 4 provided below illustrates values of the pad parameters in the deformed state 172 of the body 160 based on the variation of the pad elastic modulus of the body 160 (Case 3).

TABLE 4

| Pad Elastic Modulus | | | | |
| --- | --- | --- | --- | --- |
| Case 3 (MPa) | Average Corner Radius 168R (mm) | Exit Angle θ (degrees) | Contact Radius 162R (mm) | Maximum Radius 166R (mm) |
| 3.3 | 1.807 | 81.960 | 19.6995 | 21.8295 |
| 6.6 | 1.585 | 84.314 | 19.756 | 21.6205 |
| 33 | 1.227 | 88.014 | 20.131 | 21.425 |

Table 5 provided below illustrates values of the pad parameters in the deformed state 172 of the body 160 of the support pad 150 based on the variation of the liner extension W of the liner 130 (Case 4).

TABLE 5

| | Liner Extension (W) | | | |
|---|---|---|---|---|
| Case 4 (mm) | Average Corner Radius 168R (mm) | Exit Angle θ (degrees) | Contact Radius 162R (mm) | Maximum Radius 166R (mm) |
| 1 | 1.807 mm | 81.960 | 19.6995 | 21.8295 |
| 2 | 1.849 mm | 79.507 | 19.711 | 21.9455 |
| 4 | 1.928 mm | 59.780 | 19.961 | 22.1415 |

FIGS. 5A-5D illustrate graphs 500A-500D depicting the variation of the pad parameters (the average corner radius 168R, the exit angle θ, the contact radius 162R, and the maximum radius 166R; on Y-axis) of the support pad 150 with respect to the lamination parameters (the liner elastic modulus, the pad elastic modulus, the height 160H of the body 160, the pressure P', the liner extension W, the maximum diameter 160D, and the vertical distance Vd; on X-axis). The graphs 500A-500D may correspond to Tables 2-5 illustrated above. It may be noted that the graphs 500A-500D of FIGS. 5A-5D, respectively, are based on the experiments performed by varying one lamination parameter from the standard value of the one lamination parameter, while retaining the standard value of each of the other lamination parameters as shown in Table 1A.

Figure 5A:
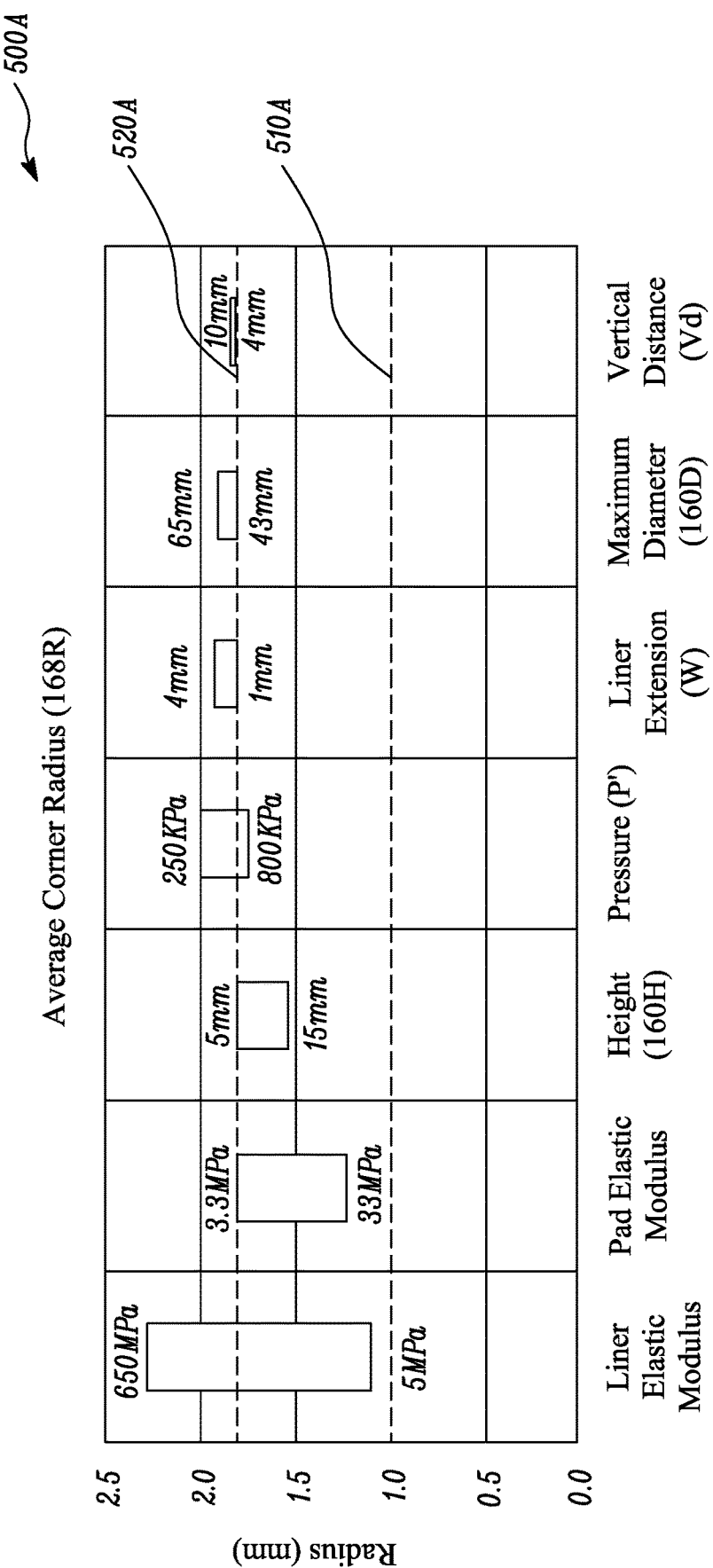
FIG. 5A is an exemplary graph illustrating a variation of an average corner radius of the support pad with respect to various lamination parameters.

FIG. 5A illustrates the graph 500A depicting a variation of the average corner radius 168R with respect to the lamination parameters. The graph 500A includes a line 510A depicting an optimal value of the average corner radius 168R of the support pad 150. The optimal value of the average corner radius 168R may be substantially equal to the average corner radius 168R in the undeformed state 170 of the body 160 (i.e., about 1 mm). The graph 500A further includes a line 520A depicting the standard value of the average corner radius 168R of the support pad 150 based on the standard values of the lamination parameters shown in Table 1A.

The lamination quality of the adhesive 110 may improve as a value of the average corner radius 168R in the deformed state 172 of the support pad 150 tends toward the line 510A (about 1 mm). As is apparent in FIG. 5A, the average corner radius 168R in the deformed state 172 tended toward the line 510A when the liner elastic modulus of the liner 130 was about 5 MPa. Further, the average corner radius 168R of the support pad 150 in the deformed state 172 tended toward the line 510A when the pad elastic modulus of the support pad 150 was about 33 MPa. Moreover, the average corner radius 168R in the deformed state 172 tended toward the line 510A when the height 160H of the body 160 was about 15 mm.

Figure 5B:
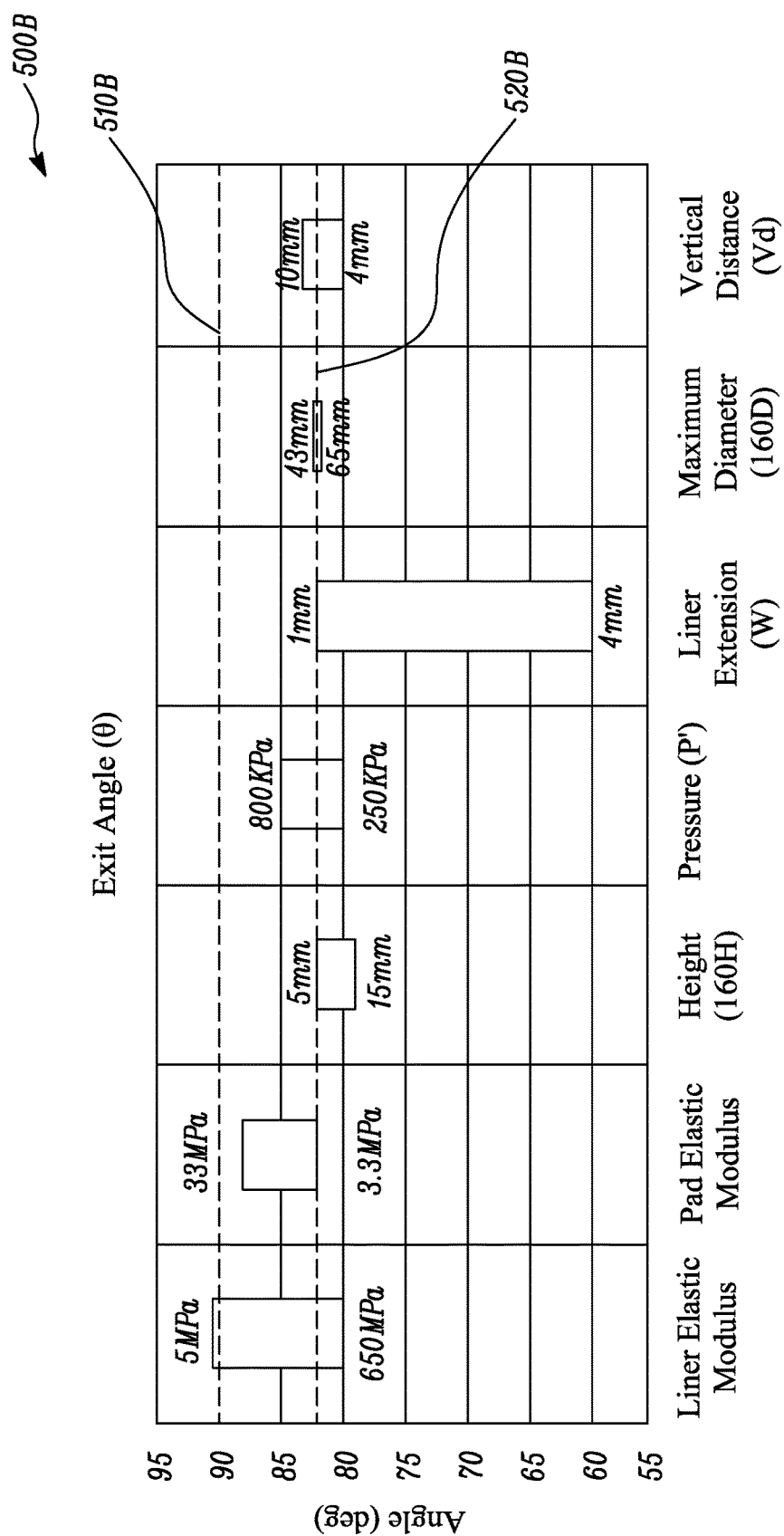
FIG. 5B is an exemplary graph illustrating a variation of an exit angle with respect to the lamination parameters.

FIG. 5B illustrates the graph 500B depicting a variation of the exit angle θ with respect to the lamination parameters. The graph 500B includes a line 510B depicting an optimal value of the exit angle θ. The optimal value of the exit angle θ may be about 90 degrees. The graph 500B further includes a line 520B depicting the standard value of the exit angle θ based on the standard values of the lamination parameters shown in Table 1A.

The lamination quality of the adhesive 110 may improve as a value of the exit angle θ tends toward the line 510B. As is apparent in FIG. 5B, the exit angle θ tended toward the line 510B when the liner elastic modulus of the liner 130 was about 5 MPa. Furthermore, the exit angle θ tended toward the line 510B when the pad elastic modulus of the support pad 150 was about 33 MPa. Moreover, the exit angle θ tended toward the line 510B when the pressure P' was about 800 kPa. It may be noted that an increase in a value of the liner extension W negatively affected the value of the exit angle θ (i.e., the value of the exit angle θ tended away from the line 510B).

Figure 5C:
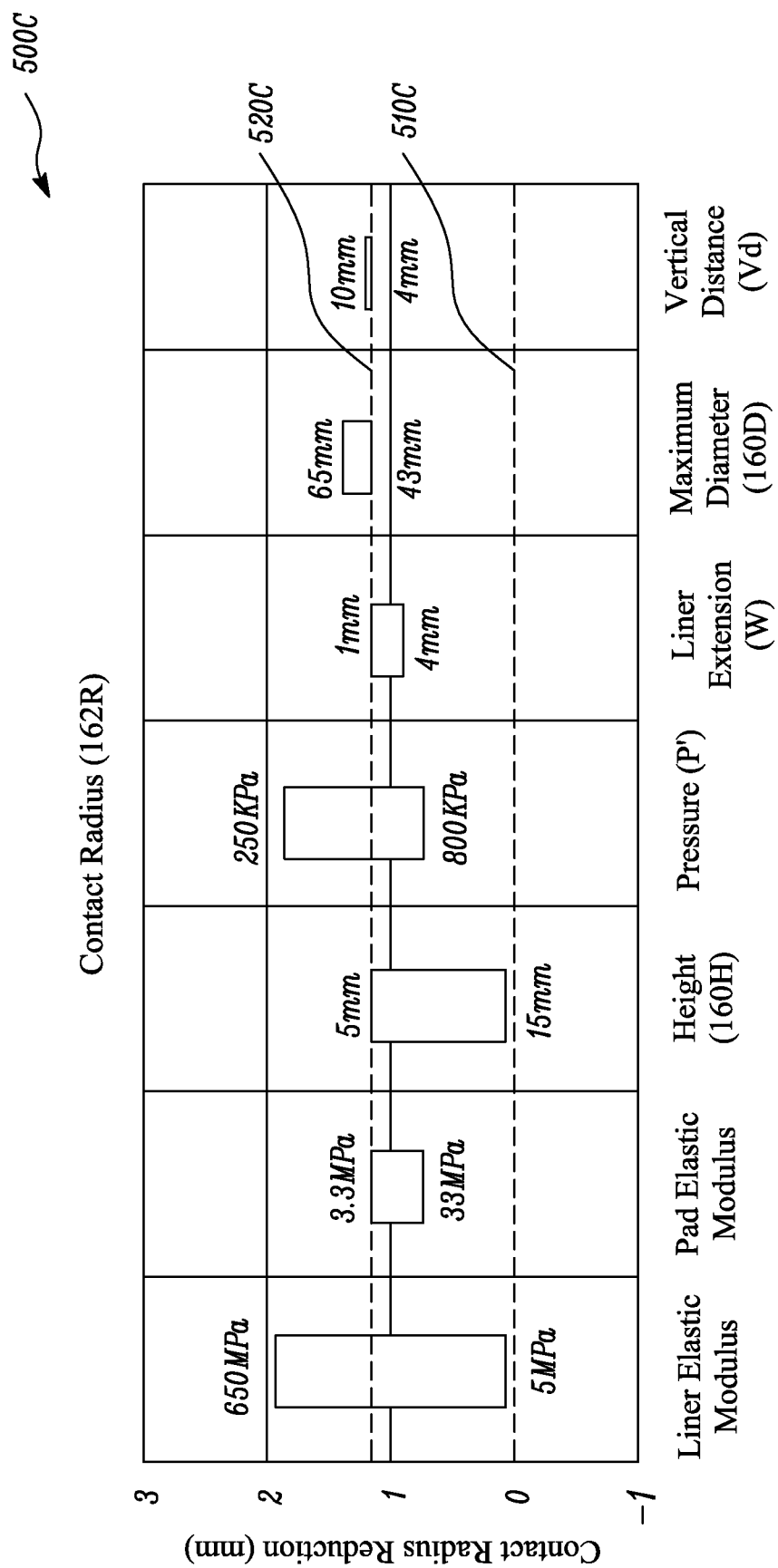
FIG. 5C is an exemplary graph illustrating a reduction in a contact radius of the support pad with respect to the lamination parameters.

FIG. 5C illustrates the graph 500C depicting a reduction in the contact radius 162R with respect to the lamination parameters. The graph 500C includes a line 510C depicting an optimal case (i.e., no reduction in the contact radius 162R). The graph 500C further includes a line 520C depicting a standard reduction in a value of the contact radius 162R of the support pad 150 based on the standard values of the lamination parameters shown in Table 1A.

The lamination quality of the adhesive 110 may improve as the reduction in the contact radius 162R tends toward the line 510C (i.e., no reduction in the contact radius 162R). As is apparent in FIG. 5C, the reduction in the contact radius 162R of the support pad 150 in the deformed state 172 tended toward the line 510C when the liner elastic modulus of the liner 130 was about 5 MPa. Further, the reduction in the contact radius 162R in the deformed state 172 tended toward the line 510C when the height 160H of the body 160 was about 15 mm. Furthermore, the reduction in the contact radius 162R in the deformed state 172 tended toward the line 510C when the pad elastic modulus of the support pad 150 was about 33 MPa. Moreover, the reduction in the contact radius 162R in the deformed state 172 tended toward the line 510C when the pressure P' was about 800 kPa.

Figure 5D:
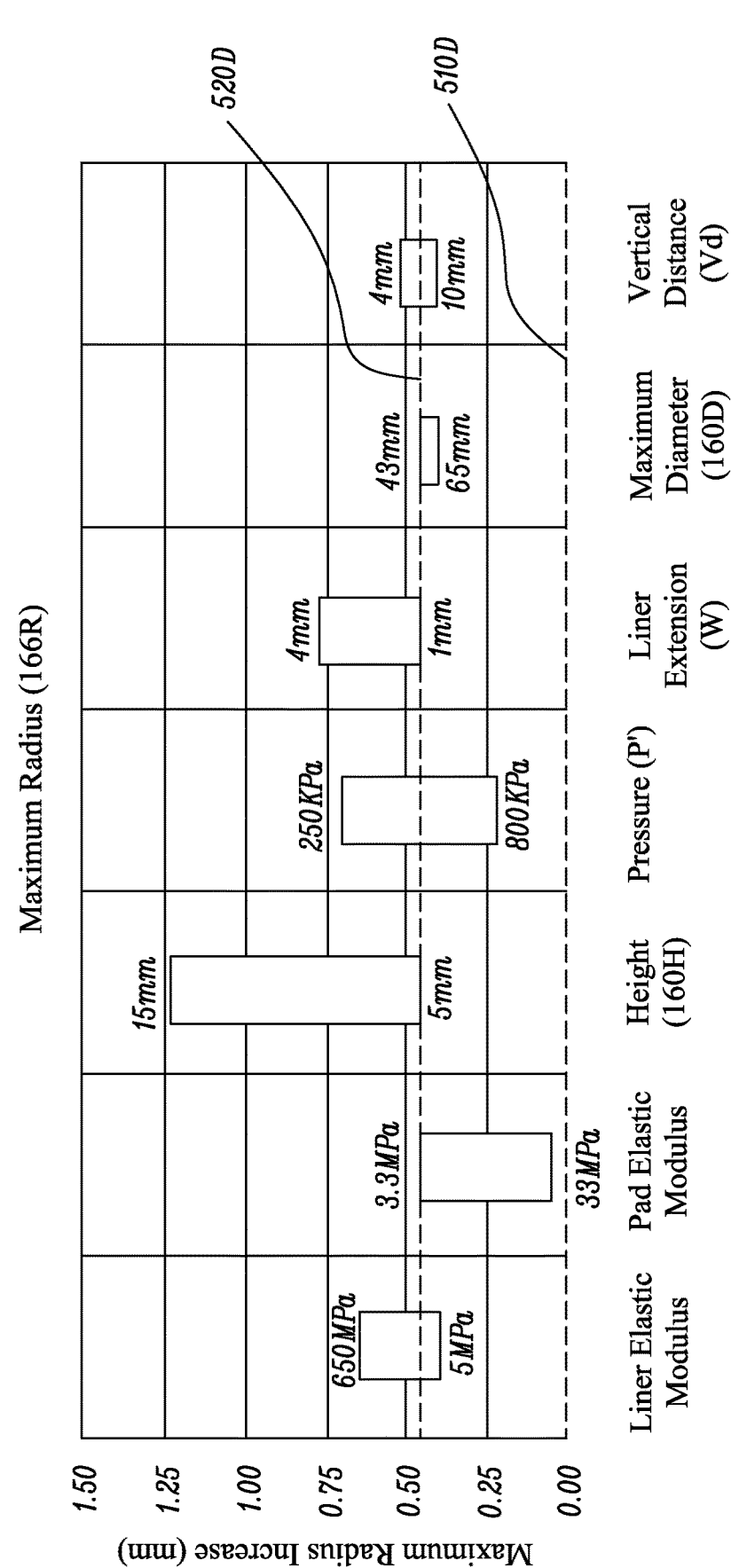
FIG. 5D is an exemplary graph illustrating an increase in a maximum radius of the support pad with respect to the lamination parameters.

FIG. 5D illustrates the graph 500D depicting an increase in the maximum radius 166R with respect to the lamination parameters. The graph 500D includes a line 510D depicting an optimal case (i.e., no increase in the maximum radius 166R). The graph 500D further includes a line 520D depicting a standard increase in the maximum radius 166R of the support pad 150 based on the standard values of the lamination parameters shown in Table 1A.

The lamination quality of the adhesive 110 may improve as an increase in the maximum radius 166R of the support pad 150 tends toward the line 510D (i.e., no increase in the maximum radius 166R). As is apparent in FIG. 5D, the increase in the maximum radius 166R in the deformed state 172 tended toward the line 510C when the pad elastic modulus of the support pad 150 was about 33 MPa. Moreover, the increase in the maximum radius 166R in the deformed state 172 tended toward the line 510D when the pressure P' applied to the support pad 150 was about 800 kPa. It may be noted that an increase in a value of the height 160H negatively affected the maximum radius 166R (i.e., the increase in the maximum radius 166R tended away from the line 510D).

Therefore, the optimal shape of the support pad 150 may be retained in the deformed state 172 of the body 160 by modifying the lamination parameters. As discussed above, this may allow conforming the adhesive 110 and the liner 130 to the desired shape, thereby improving the lamination quality of the adhesive 110 to the component 120 as provided by the system 100.

Unless otherwise indicated, all numbers expressing feature sizes, amounts, and physical properties used in the specification and claims are to be understood as being modified in all instances by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

Various examples have been described. These and other examples are within the scope of the following claims.

The invention claimed is:

1. A system for laminating an adhesive to a component, the system comprising:
    a liner comprising a first major surface facing the component and a second major surface opposite to the first major surface;
    an adhesive disposed on the first major surface of the liner, the adhesive configured to be laminated to the component; and
    a support pad engaging the second major surface of the liner for laminating the adhesive to the component, wherein each of the support pad and the liner undergoes deformation upon engagement of the support pad with the liner, the support pad comprising:
        a body made of an elastic pad material, the body comprising:
            an upper surface facing the component;
            a lower surface opposite to the upper surface; and
            a lateral surface disposed between the upper surface and the lower surface;
    wherein the liner comprises a conformable liner material having a liner elastic modulus from about 5 MPa to about 650 MPa, and wherein a yield stress of the liner material is from about 10 MPa to about 100 MPa.

2. The system of claim 1, wherein the liner material comprises at least one of polyurethane, polyethylene, polypropylene, ethylene-vinyl acetate, and polyvinyl butyral.

3. The system of claim 1, wherein a liner tangent modulus of the liner material is from about 1 MPa to about 1.5 MPa after yield.

4. The system of claim 1, wherein:
    the lateral surface comprises a curved portion extending from the upper surface, the curved portion defining an average corner radius;
    the average corner radius is equal to an original average corner radius in an undeformed state of the body;
    the average corner radius is equal to a deformed average corner radius in a deformed state of the body; and
    the elastic pad material has a pad elastic modulus from about 1 MPa to about 35 MPa, such that a difference between the deformed average corner radius and the original average corner radius is less than or equal to 25% of the original average corner radius.

5. The system of claim 1, wherein:
    the lateral surface comprises a curved portion extending from the upper surface, the curved portion defining an average corner radius;
    the average corner radius is equal to an original average corner radius in an undeformed state of the body;
    the average corner radius is equal to a deformed average corner radius in a deformed state of the body; and
    the liner elastic modulus is about 5 MPa, such that a difference between the deformed average corner radius and the original average corner radius is less than or equal to 10% of the original average corner radius.

6. The system of claim 4, wherein:
    the lateral surface defines a maximum radius; and
    the maximum radius is equal to an original maximum radius in the undeformed state of the body, such that a change in the maximum radius between the deformed state and the undeformed state of the body is less than 5% of the original maximum radius.

7. The system of claim 1, wherein:
    the upper surface defines a contact radius;
    the contact radius is equal to an original contact radius in an undeformed state of the body; and
    the body defines a height from the upper surface to the lower surface, wherein the height is about 15 mm, such that a change in the contact radius between a deformed state and the undeformed state of the body is less than 5% of the original contact radius.

8. The system of claim 7, wherein the liner elastic modulus is about 5 MPa, such that the change in the contact radius between the deformed state and the undeformed state of the body is less than 2% of the original contact radius.

9. The system of claim 5, wherein the second major surface of the liner engages the lateral surface during lamination of the adhesive to the component, such that an exit angle is defined between the liner and a longitudinal direction, and wherein the exit angle is about 90 degrees.

10. The system of claim 1, wherein the upper surface of the body is substantially planar.

11. The system of claim 1, wherein a pad elastic modulus of the elastic pad material is from about 1 MPa to about 35 MPa.

12. A method of laminating an adhesive to a component, the method comprising:
    providing a liner comprising a first major surface and a second major surface, and an adhesive disposed on the first major surface of the liner;
    pressing the second major surface of the liner on an upper surface of a support pad, such that the second major surface of the liner engages a lateral surface of the support pad and the support pad deforms; and
    moving the support pad against the component, such that the adhesive is laminated to the component;

wherein:

the support pad is made of an elastic pad material; and the liner comprises a conformable liner material having a liner elastic modulus from about 5 MPa to about 650 MPa, and wherein a yield stress of the liner material is from about 10 MPa to about 100 MPa.

13. The method of claim 12, wherein the liner material comprises at least one of polyurethane, polyethylene, polypropylene, ethylene-vinyl acetate, and polyvinyl butyral.

14. The method of claim 12, wherein:

the lateral surface comprises a curved portion extending from the upper surface, the curved portion defining an average corner radius;

the average corner radius is equal to an original average corner radius in an undeformed state of the support pad;

the average corner radius is equal to a deformed average corner radius in a deformed state of the support pad; and the elastic pad material has a pad elastic modulus from about 1 MPa to about 35 MPa, such that a difference between the deformed average corner radius and the original average corner radius is less than or equal to 25% of the original average corner radius.

15. The method of claim 12, wherein:

the lateral surface comprises a curved portion extending from the upper surface, the curved portion defining an average corner radius;

the average corner radius is equal to an original average corner radius in an undeformed state of the support pad;

the average corner radius is equal to a deformed average corner radius in a deformed state of the support pad; and the liner elastic modulus is about 5 MPa, such that a difference between the deformed average corner radius and the original average corner radius is less than or equal to 10% of the original average corner radius.

16. The method of claim 12, wherein pressing the second major surface of the liner on the upper surface of the support pad further comprises stretching the liner in a vertical direction by a vertical distance, and wherein the vertical distance is from about 4 mm to about 10 mm.

17. The method of claim 12, wherein the support pad defines a height from the upper surface to a lower surface of the support pad, and wherein the height is from about 5 mm to about 20 mm.

18. The method of claim 17, wherein:

the upper surface defines a contact radius;

the contact radius is equal to an original contact radius in an undeformed state of the support pad; and the height of the support pad is about 15 mm, such that a change in the contact radius between the deformed state and the undeformed state of the support pad is less than 5% of the original contact radius.

19. The method of claim 15, wherein the second major surface of the liner engages the lateral surface during lamination of the adhesive to the component, such that an exit angle is defined between the liner and a longitudinal direction, and wherein the exit angle is about 90 degrees.

* * * * *